(12) United States Patent
Drennan

(10) Patent No.: US 7,894,807 B1
(45) Date of Patent: Feb. 22, 2011

(54) SYSTEM AND METHOD FOR ROUTING A WIRELESS CONNECTION IN A HYBRID NETWORK

(75) Inventor: Mark Drennan, Fort Collins, CO (US)

(73) Assignee: Openwave Systems Inc., Redwood City, CA (US)

(\*) Notice: Subject to any disclaimer, the term of this patent is extended or adjusted under 35 U.S.C. 154(b) by 511 days.

(21) Appl. No.: 11/389,350

(22) Filed: Mar. 24, 2006

Related U.S. Application Data

(60) Provisional application No. 60/666,676, filed on Mar. 30, 2005.

(51) Int. Cl.
*H04M 3/42* (2006.01)
*H04M 1/00* (2006.01)
*H04W 4/00* (2009.01)
*H04W 40/00* (2009.01)

(52) U.S. Cl. ............ 455/417; 379/142.14; 379/201.07; 379/202.01; 379/88.02; 379/207.02; 455/422.1; 455/433; 455/435.2; 455/445; 455/552.1; 370/227; 370/351; 370/352; 370/386; 370/400; 340/7.21; 340/573.4; 340/7.22; 340/539.18; 340/539.13; 706/12; 709/231; 709/217; 709/240; 709/232; 709/225; 358/1.15; 701/1; 701/16; 701/201; 701/202; 704/235; 704/277

(58) Field of Classification Search .............. 455/552.1, 455/443, 553.1, 445, 433, 417, 422.1, 435, 455/459, 564; 379/49, 201.07, 207.02, 142.14, 379/202.01, 88.02; 340/539.13, 7.21, 573.4, 340/7.22, 539.18; 345/863; 370/352, 227, 370/351, 286, 400; 709/316, 231, 217, 240, 709/232, 225; 701/1, 16, 202, 201; 705/25; 715/744; 706/12; 358/1.15; 704/235, 277
See application file for complete search history.

(56) References Cited

U.S. PATENT DOCUMENTS

| | | | | |
|---|---|---|---|---|
| 5,127,042 | A * | 6/1992 | Gillig et al. | 455/552.1 |
| 5,239,571 | A * | 8/1993 | Takahashi | 455/564 |
| 5,260,988 | A * | 11/1993 | Schellinger et al. | 455/552.1 |
| 5,295,179 | A * | 3/1994 | Asahara et al. | 455/459 |
| 5,329,574 | A * | 7/1994 | Nielson et al. | 455/435.2 |
| 5,341,414 | A * | 8/1994 | Popke | 379/142.14 |
| 5,367,558 | A * | 11/1994 | Gillig et al. | 455/426.1 |
| 5,463,674 | A * | 10/1995 | Gillig et al. | 455/552.1 |
| 5,504,803 | A * | 4/1996 | Yamada et al. | 455/426.1 |
| 5,533,097 | A * | 7/1996 | Crane et al. | 455/552.1 |
| 5,590,172 | A * | 12/1996 | Lodwig et al. | 455/436 |
| 5,608,782 | A * | 3/1997 | Carlsen et al. | 455/461 |
| 5,610,970 | A * | 3/1997 | Fuller et al. | 455/417 |
| 5,625,672 | A * | 4/1997 | Yamada | 455/450 |
| 5,633,915 | A * | 5/1997 | Yang et al. | 455/443 |
| 5,644,626 | A * | 7/1997 | Carlsen et al. | 340/7.21 |

(Continued)

*Primary Examiner*—William D Cumming

(57) ABSTRACT

Systems and methods for establishing and/or routing wireless data and/or voice connections across a hybrid network based upon a user's selection or preference. Routing a wireless connection across a hybrid network includes allowing a user to select a routing preference, routing the wireless connection via a short-haul communications network if the routing preference indicates a short-haul communications network choice, and routing the wireless connection via a cellular network if the routing preference indicates a cellular network choice. In addition, a system and method for learning the user's data, cellular, and/or VoIP access habits in order, to optimize the user's experience and one that allows carriers to comply with CALEA and E911 rules by identifying the location of hybrid devices within the hybrid network are disclosed.

23 Claims, 3 Drawing Sheets

U.S. PATENT DOCUMENTS

| | | | | |
|---|---|---|---|---|
| 5,649,298 | A * | 7/1997 | Ablay | 455/520 |
| 5,652,751 | A * | 7/1997 | Sharony | 370/227 |
| 5,673,308 | A * | 9/1997 | Akhavan | 455/461 |
| 5,675,629 | A * | 10/1997 | Raffel et al. | 455/552.1 |
| 5,703,930 | A * | 12/1997 | Miska et al. | 455/426.1 |
| 5,727,057 | A * | 3/1998 | Emery et al. | 379/201.07 |
| 5,812,955 | A * | 9/1998 | Dent et al. | 455/561 |
| 5,842,122 | A * | 11/1998 | Schellinger et al. | 455/403 |
| 5,884,167 | A * | 3/1999 | Carlsen et al. | 455/432.1 |
| 5,894,592 | A * | 4/1999 | Brueske et al. | 455/86 |
| 5,911,120 | A * | 6/1999 | Jarett et al. | 455/417 |
| 5,924,016 | A * | 7/1999 | Fuller et al. | 379/202.01 |
| 5,953,658 | A * | 9/1999 | Scott | 455/422.1 |
| 5,963,863 | A * | 10/1999 | Berggren | 455/445 |
| 5,978,672 | A | 11/1999 | Hartmaier et al. | |
| 6,011,960 | A * | 1/2000 | Yamada et al. | 455/77 |
| 6,011,975 | A * | 1/2000 | Emery et al. | 455/456.1 |
| 6,054,928 | A * | 4/2000 | Lemelson et al. | 340/573.4 |
| 6,058,307 | A * | 5/2000 | Garner | 455/428 |
| 6,058,316 | A * | 5/2000 | Takahashi | 455/552.1 |
| 6,078,282 | A * | 6/2000 | Casey | 342/357.06 |
| 6,101,242 | A * | 8/2000 | McAllister et al. | 379/88.02 |
| 6,104,912 | A * | 8/2000 | Fuller et al. | 340/7.23 |
| 6,112,085 | A * | 8/2000 | Garner et al. | 455/428 |
| 6,122,357 | A * | 9/2000 | Farris et al. | 379/207.02 |
| 6,141,560 | A * | 10/2000 | Gillig et al. | 455/553.1 |
| 6,148,193 | A * | 11/2000 | Miska et al. | 455/410 |
| 6,167,119 | A * | 12/2000 | Bartholomew et al. | 379/88.04 |
| 6,167,278 | A * | 12/2000 | Nilssen | 455/462 |
| 6,181,935 | B1 | 1/2001 | Gossman et al. | |
| 6,192,254 | B1 * | 2/2001 | Carlsen et al. | 455/552.1 |
| 6,243,580 | B1 * | 6/2001 | Garner | 455/428 |
| 6,256,514 | B1 * | 7/2001 | Dent et al. | 455/561 |
| 6,266,535 | B1 * | 7/2001 | Cullen et al. | 455/461 |
| 6,363,246 | B1 * | 3/2002 | Williams et al. | 455/403 |
| 6,411,806 | B1 * | 6/2002 | Garner et al. | 455/428 |
| 6,418,324 | B1 * | 7/2002 | Doviak et al. | 455/426.1 |
| 6,421,538 | B1 * | 7/2002 | Byrne | 455/441 |
| 6,437,696 | B1 * | 8/2002 | Lemelson et al. | 340/573.4 |
| 6,463,277 | B1 * | 10/2002 | Miska et al. | 455/410 |
| 6,498,843 | B1 * | 12/2002 | Cox | 379/207.02 |
| 6,542,739 | B1 * | 4/2003 | Garner | 455/427 |
| 6,545,589 | B1 * | 4/2003 | Fuller et al. | 340/7.22 |
| 6,611,692 | B2 * | 8/2003 | Raffel et al. | 455/552.1 |
| 6,650,633 | B1 * | 11/2003 | Albers et al. | 370/352 |
| 6,681,118 | B2 * | 1/2004 | Raffel et al. | 455/552.1 |
| 6,735,432 | B1 * | 5/2004 | Jarett et al. | 455/417 |
| 6,751,297 | B2 * | 6/2004 | Nelkenbaum | 379/88.13 |
| 6,789,060 | B1 * | 9/2004 | Wolfe et al. | 704/235 |
| 6,823,059 | B2 * | 11/2004 | Kalmanek et al. | 379/219 |
| 6,826,405 | B2 * | 11/2004 | Doviak et al. | 455/445 |
| 6,839,323 | B1 * | 1/2005 | Foti | 370/235 |
| 6,842,877 | B2 * | 1/2005 | Robarts et al. | 715/708 |
| 6,901,240 | B2 * | 5/2005 | Tokoro | 455/3.03 |
| 6,914,964 | B1 * | 7/2005 | Levine | 379/52 |
| 6,965,816 | B2 * | 11/2005 | Walker | 701/16 |
| 6,988,109 | B2 * | 1/2006 | Stanley et al. | 707/103 Y |
| 7,003,669 | B2 * | 2/2006 | Monk | 713/182 |
| 7,016,478 | B2 * | 3/2006 | Potorny et al. | 379/49 |
| 7,027,773 | B1 * | 4/2006 | McMillin | 455/41.2 |
| 7,034,678 | B2 * | 4/2006 | Burkley et al. | 340/539.13 |
| 7,035,646 | B2 * | 4/2006 | Raffel et al. | 455/456.1 |
| 7,055,101 | B2 * | 5/2006 | Abbott et al. | 715/744 |
| 7,068,760 | B2 * | 6/2006 | Binning | 379/45 |
| 7,076,737 | B2 * | 7/2006 | Abbott et al. | 715/744 |
| 7,080,322 | B2 * | 7/2006 | Abbott et al. | 715/744 |
| 7,091,851 | B2 * | 8/2006 | Mason et al. | 340/539.13 |
| 7,107,539 | B2 * | 9/2006 | Abbott et al. | 715/744 |
| 7,120,687 | B1 * | 10/2006 | Tessman et al. | 709/224 |
| 7,137,069 | B2 * | 11/2006 | Abbott et al. | 715/744 |
| 7,191,244 | B2 * | 3/2007 | Jennings et al. | 709/231 |
| 7,197,513 | B2 * | 3/2007 | Tessman et al. | 707/104.1 |
| 7,206,397 | B1 * | 4/2007 | Kalmanek, Jr. et al. | 379/219 |
| 7,245,216 | B2 * | 7/2007 | Burkley et al. | 340/539.13 |
| 7,245,704 | B2 * | 7/2007 | Binning | 379/45 |
| 7,245,900 | B1 * | 7/2007 | Lamb et al. | 455/404.1 |
| 7,283,519 | B2 * | 10/2007 | Girard | 370/353 |
| 7,349,768 | B2 * | 3/2008 | Bruce et al. | 701/1 |
| 7,355,507 | B2 * | 4/2008 | Binning | 340/332 |
| 7,395,056 | B2 * | 7/2008 | Petermann | 455/422.1 |
| 2001/0040590 | A1 * | 11/2001 | Abbott et al. | 345/700 |
| 2001/0040591 | A1 * | 11/2001 | Abbott et al. | 345/700 |
| 2001/0043231 | A1 * | 11/2001 | Abbott et al. | 345/700 |
| 2001/0043232 | A1 * | 11/2001 | Abbott et al. | 345/700 |
| 2002/0054174 | A1 * | 5/2002 | Abbott et al. | 345/863 |
| 2002/0067272 | A1 * | 6/2002 | Lemelson et al. | 340/573.4 |
| 2002/0071529 | A1 * | 6/2002 | Nelkenbaum | 379/88.13 |
| 2002/0075844 | A1 * | 6/2002 | Hagen | 370/351 |
| 2002/0083025 | A1 * | 6/2002 | Robarts et al. | 706/12 |
| 2002/0099842 | A1 * | 7/2002 | Jennings et al. | 709/231 |
| 2002/0135801 | A1 * | 9/2002 | Tessman et al. | 358/1.15 |
| 2002/0176404 | A1 * | 11/2002 | Girard | 370/352 |
| 2002/0198858 | A1 * | 12/2002 | Stanley et al. | 706/50 |
| 2003/0093187 | A1 * | 5/2003 | Walker | 701/1 |
| 2003/0115459 | A1 * | 6/2003 | Monk | 713/168 |
| 2003/0134648 | A1 * | 7/2003 | Reed et al. | 455/456 |
| 2003/0202510 | A1 * | 10/2003 | Witkowski et al. | 370/386 |
| 2003/0202520 | A1 * | 10/2003 | Witkowski et al. | 370/400 |
| 2003/0228875 | A1 * | 12/2003 | Alapuranen | 455/522 |
| 2004/0003132 | A1 * | 1/2004 | Stanley et al. | 709/316 |
| 2004/0070515 | A1 * | 4/2004 | Burkley et al. | 340/825.49 |
| 2004/0146047 | A1 * | 7/2004 | Turcan et al. | 370/352 |
| 2004/0192353 | A1 * | 9/2004 | Mason et al. | 455/457 |
| 2004/0196842 | A1 * | 10/2004 | Dobbins | 370/389 |
| 2004/0199604 | A1 * | 10/2004 | Dobbins et al. | 709/217 |
| 2004/0199667 | A1 * | 10/2004 | Dobbins | 709/240 |
| 2004/0204938 | A1 * | 10/2004 | Wolfe et al. | 704/235 |
| 2004/0215654 | A1 * | 10/2004 | Eberwine et al. | 707/102 |
| 2005/0080520 | A1 * | 4/2005 | Kline et al. | 701/1 |
| 2005/0108415 | A1 * | 5/2005 | Turk et al. | 709/232 |
| 2005/0134455 | A1 * | 6/2005 | Binning | 340/539.18 |
| 2005/0135570 | A1 * | 6/2005 | Binning | 379/45 |
| 2005/0143048 | A1 * | 6/2005 | Binning | 455/404.2 |
| 2005/0169438 | A1 * | 8/2005 | Binning | 379/45 |
| 2005/0169439 | A1 * | 8/2005 | Binning | 379/45 |
| 2005/0183143 | A1 * | 8/2005 | Anderholm et al. | 726/22 |
| 2005/0187677 | A1 * | 8/2005 | Walker | 701/16 |
| 2005/0226170 | A1 * | 10/2005 | Relan et al. | 370/254 |
| 2005/0226201 | A1 * | 10/2005 | McMillin | 370/348 |
| 2005/0234730 | A1 * | 10/2005 | Wolfe et al. | 704/277 |
| 2005/0267971 | A1 * | 12/2005 | Fritz | 709/225 |
| 2005/0283388 | A1 * | 12/2005 | Eberwine et al. | 705/4 |
| 2005/0286519 | A1 * | 12/2005 | Ravikumar et al. | 370/389 |
| 2005/0289166 | A1 * | 12/2005 | Stanley et al. | 707/100 |
| 2006/0004680 | A1 * | 1/2006 | Robarts et al. | 706/12 |
| 2006/0020960 | A1 * | 1/2006 | Relan et al. | 725/30 |
| 2006/0026017 | A1 * | 2/2006 | Walker | 705/1 |
| 2006/0039359 | A1 * | 2/2006 | Pang | 370/352 |
| 2006/0039365 | A1 * | 2/2006 | Ravikumar et al. | 370/352 |
| 2006/0050700 | A1 * | 3/2006 | Ravikumar et al. | 370/389 |
| 2006/0095199 | A1 * | 5/2006 | Lagassey | 701/117 |
| 2006/0095365 | A1 * | 5/2006 | Ravikumar et al. | 705/37 |
| 2006/0120375 | A1 * | 6/2006 | Ravikumar et al. | 370/392 |
| 2006/0146792 | A1 * | 7/2006 | Ramachandran et al. | 370/352 |
| 2006/0158329 | A1 * | 7/2006 | Burkley et al. | 340/539.13 |
| 2006/0203750 | A1 * | 9/2006 | Ravikumar et al. | 370/261 |
| 2006/0206246 | A1 * | 9/2006 | Walker | 701/16 |
| 2006/0206310 | A1 * | 9/2006 | Ravikumar et al. | 704/9 |
| 2006/0218624 | A1 * | 9/2006 | Ravikumar et al. | 726/3 |
| 2006/0227942 | A1 * | 10/2006 | Binning | 379/45 |
| 2006/0233317 | A1 * | 10/2006 | Coster et al. | 379/45 |
| 2006/0239255 | A1 * | 10/2006 | Ramachandran et al. | 370/352 |
| 2006/0241853 | A1 * | 10/2006 | Gadler | 701/201 |
| 2006/0241855 | A1 * | 10/2006 | Joe et al. | 701/202 |

| | | | | | | |
|---|---|---|---|---|---|---|
| 2006/0241856 A1* | 10/2006 | Cobleigh et al. ............ 701/202 | 2007/0165597 A1* | 7/2007 | Chaturvedi et al. ......... 370/351 |
| 2006/0242108 A1* | 10/2006 | Cuspard et al. ................ 707/1 | 2007/0165629 A1* | 7/2007 | Chaturvedi et al. ......... 370/389 |
| 2006/0242199 A1* | 10/2006 | Cobleigh et al. ......... 707/104.1 | 2007/0169149 A1* | 7/2007 | Jennings et al. ............... 725/58 |
| 2006/0246908 A1* | 11/2006 | Petermann .................. 455/444 | 2007/0196074 A1* | 8/2007 | Jennings et al. ............... 386/46 |
| 2006/0246909 A1* | 11/2006 | Petermann .................. 455/444 | 2007/0197212 A1* | 8/2007 | Marsico et al. .............. 455/433 |
| 2006/0246910 A1* | 11/2006 | Petermann .................. 455/444 | 2007/0198739 A1* | 8/2007 | Jennings et al. ............. 709/231 |
| 2006/0246911 A1* | 11/2006 | Petermann .................. 455/444 | 2007/0214493 A1* | 9/2007 | Davis ............................ 726/2 |
| 2006/0256736 A1* | 11/2006 | Koehler et al. ............... 370/254 | 2007/0225978 A1* | 9/2007 | Wolfe et al. .................. 704/235 |
| 2006/0256933 A1* | 11/2006 | Wolfe et al. ................... 379/75 | 2007/0280428 A1* | 12/2007 | McClelland ................. 379/37 |
| 2006/0265294 A1* | 11/2006 | de Sylva ....................... 705/28 | 2007/0280429 A1* | 12/2007 | Binning ........................ 379/37 |
| 2006/0265397 A1* | 11/2006 | Bryan et al. .................. 707/10 | 2007/0291734 A1* | 12/2007 | Bhatia et al. ................. 370/352 |
| 2006/0274688 A1* | 12/2006 | Maxwell et al. ............. 370/328 | 2007/0293958 A1* | 12/2007 | Stehle et al. .................. 700/30 |
| 2006/0282662 A1* | 12/2006 | Whitcomb .................. 713/156 | 2008/0010672 A1* | 1/2008 | Buffmire ....................... 726/4 |
| 2006/0291450 A1* | 12/2006 | Ramachandran et al. .... 370/352 | 2008/0013533 A1* | 1/2008 | Bogineni et al. ............. 370/389 |
| 2007/0004517 A1* | 1/2007 | Mahajan ...................... 463/42 | 2008/0034444 A1* | 2/2008 | Sears ........................... 726/29 |
| 2007/0016598 A1* | 1/2007 | Tessman et al. ............. 707/100 | 2008/0045234 A1* | 2/2008 | Reed ....................... 455/456.1 |
| 2007/0019563 A1* | 1/2007 | Ramachandran et al. .... 370/252 | 2008/0046134 A1* | 2/2008 | Bruce et al. .................... 701/1 |
| 2007/0019625 A1* | 1/2007 | Ramachandran et al. .... 370/352 | 2008/0089273 A1* | 4/2008 | Cotton et al. ................ 370/328 |
| 2007/0022384 A1* | 1/2007 | Abbott et al. ................ 715/744 | 2008/0117863 A1* | 5/2008 | Cotton et al. ................ 370/328 |
| 2007/0078720 A1* | 4/2007 | Ravikumar et al. ........... 705/25 | 2008/0137659 A1* | 6/2008 | Levy-Abegnoli et al. .... 370/392 |
| 2007/0079012 A1* | 4/2007 | Walker ....................... 709/249 | 2008/0159501 A1* | 7/2008 | Cai ......................... 379/142.05 |
| 2007/0094263 A1* | 4/2007 | Tessman et al. ................ 707/9 | 2008/0168062 A1* | 7/2008 | Reeves .......................... 707/9 |
| 2007/0110043 A1* | 5/2007 | Girard ........................ 370/352 | 2008/0174100 A1* | 7/2008 | Reeves ......................... 283/70 |
| 2007/0121799 A1* | 5/2007 | Binning ........................ 379/37 | 2008/0211656 A1* | 9/2008 | Binning ...................... 340/500 |
| 2007/0124737 A1* | 5/2007 | Wensley et al. ............. 719/314 | | | |

* cited by examiner

FIG. 3

| | 110,120 | 130,140 | 170 | 150 | 140 | 150 |
|---|---|---|---|---|---|---|
| MS/DEVICE | CELL/WIFI/WIMAX ACCESS | CELL/WIFI/WIMAX NETWORK | UNDR SERVER | PDE/IP LOCATION ENTITY | USER'S ISP NETWORK | VoIP SOFT SWITCH |

POSITION REQUEST SCENARIO 305:
- MS SENDS REGISTRATION REQUEST THROUGH ANY NETWORK AVAILABLE BASED ON USER PROFILE WHICH EXISTS IN THE HANDSET
- A NETWORK PASSES THROUGH TO THE UNDR SERVER
- UNDR QUERIES PDE/IP LOCATION SERVER FOR MS
- LOCATION RETURNED TO UNDR SERVER
- UNDR SERVER ACKNOWLEDGES RECEIPT TO THE MS AND PUSHES ANY UPDATES FOR LOCAL WIRELESS (IP AND CELLULAR) TO THE MS ALONG WITH ITS OPTIMAL CONFIGURATION AND PRESET AUTHENTICATION AND QoS PARAMETERS (VoIP CAPABILITY, ETC)

DATA ONLY SESSION SCENARIO 310:
- MS ORIGINATES A DATA SESSION WITH ACCESS PARAMETERS PRESET IF REQUIRED
- MS ACCESSES THE USER'S ISP
- MS RECEIVES ACCESS ACKNOWLEDGEMENT FROM THE ISP AND BEGINS DATA SESSION
- DATA SESSION WITH MS AND ISP

VoIP DATA SESSION SCENARIO 315:
- MS ORIGINATES A VoIP DATA SESSION WITH ACCESS PARAMETERS PRESET IF REQUIRED
- MS ACCESSES THE USER'S ISP
- MS RECEIVES ACCESS ACKNOWLEDGEMENT FROM THE ISP AND BEGINS DATA SESSION
- MS BEGINS SIP OR OTHER VoIP SESSION
- VoIP SESSION (SIP, ETC)

300

SYSTEM AND METHOD FOR ROUTING A WIRELESS CONNECTION IN A HYBRID NETWORK

CROSS-REFERENCE TO RELATED APPLICATIONS

This application claims the benefit of U.S. Provisional Application 60/666,676, filed Mar. 30, 2005, the disclosure of which is hereby incorporated herein by reference.

TECHNICAL FIELD

This invention relates in general to wireless networks and, more particularly, to a system and method for routing a connection in a hybrid wireless network based on a user selection or preference.

BACKGROUND OF THE INVENTION

Wireless service rates are driven by competition among carriers. As new wireless environments are developed, rate structures must become even more competitive. An exemplary hybrid environment consists of a cellular network, such as a GSM or PCS network, coupled to a computer network, such as a wireless computer network using a Voice over Internet Protocol (VoIP). In order to take full advantage of this hybrid environment, users may operate hybrid phones or other devices capable of operating in different networks.

BRIEF SUMMARY OF THE INVENTION

The present invention provides a system and method for establishing and/or routing wireless connections via a hybrid network. In one exemplary embodiment, a user selects at least one routing preference. After his or her preferences have been selected, the user's wireless connections are routed according to those preferences. For example, a method may comprise routing the wireless connection via a short-haul communications network if the routing preference indicates a short-haul communications network choice, and routing the wireless connection via a cellular network if the routing preference indicates a cellular network choice. In another exemplary embodiment, the present invention may provide a system and method for learning the user's data, cellular, and/or VoIP access habits over a period of time for optimizing the user's preferences.

In one exemplary embodiment, the present invention may provide a system and method that complies with the Communications Assistance for Law Enforcement Act (CALEA), for example, by allowing telecommunications carriers to assist law enforcement in executing electronic surveillance pursuant to court order or other lawful authorization. In yet another exemplary embodiment, the present invention may provide a system and method that complies with Enhanced 9-1-1 (E911) rules, for example, by allowing telecommunications carriers to report the telephone number of a wireless 9-1-1 caller and the location of the antenna or base station that received the call upon valid request by a local Public Safety Answering Point (PSAP). These and other embodiments may be made possible, for example, by the identification of a hybrid device's location within a hybrid wireless network.

Certain aspects of the present invention may comprise a hybrid network in the form of, for example, a cellular network (such as a GSM, TDMA, CDMA, PCS, etc.), coupled to a wireless computer network using a Voice over Internet Protocol (VoIP), or the like. VoIP allows voice signals to be delivered as packets of data using the Internet Protocol (IP). One advantage of using VoIP and Internet telephony is that it avoids expensive tolls charged by ordinary telephone service. However, as a person of ordinary skill in the art will readily recognize in light of this disclosure, other protocols may be used.

Other aspects of the present invention may include, for example, hybrid wireless telephones, wireless modems, pagers, PDAs, laptops, computers, and the like. A hybrid phone or device may be capable of operating in at least one network of the hybrid wireless network comprising cellular networks and wireless IP networks.

In one embodiment, the invention may use a server-client architecture as well as device level programming through the use of TCP/IP and cellular signal processing for routing data, each of which is well known in the art.

BRIEF DESCRIPTION OF THE DRAWINGS

FIG. 3 is a call flow diagram, according to an exemplary embodiment of the present invention.

DETAILED DESCRIPTION OF THE INVENTION

Figure 1:
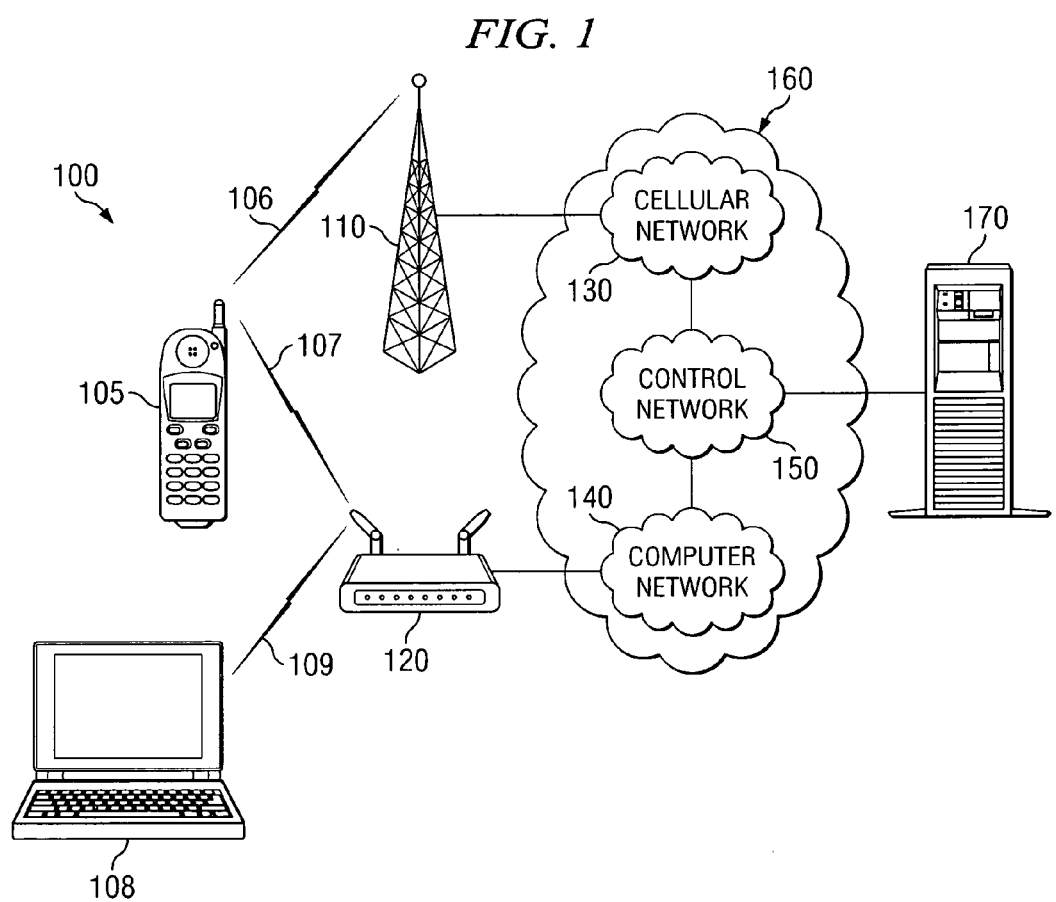
FIG. 1 is a diagram of a hybrid system embodying the present invention.

Referring to FIG. 1, a diagram of hybrid system 100 embodying the present invention is depicted. Hybrid device 105 may communicate through first wireless link 106 with an antenna at cellular base station 110. Such communication is well known in the art and is employed, for example, in many wireless networks throughout the world. Cellular base station 110 and other similar base stations are connected to cellular network 130 through a mobile switching center (not shown). Cellular network 130 may include various network components well-known in the art and used to communicate with other networks, such as, for example, a Public Switched Telephone Network (not shown). Additionally or alternatively, hybrid device 105 may also connect to wireless base station 120 through a second wireless link 107, thereby communicating with computer network 140.

Cellular network 130 may be, for example, a wireless telephony network complying with the Global System for Mobile communications (GSM), Digital-Advanced Mobile Phone Service (DAMPS), Interim Standard (IS) 136, IS 95 standards, or any other Personal Communications Services (PCS) wireless network. The term "network" as used herein refers generally to typical infrastructure and components of a telecommunications network, such as base stations, mobile switching centers, switching and control networks, and any other related nodes or elements, including Visitor Location Registers (VLR), Signaling Control Points, message centers, and the like. Computer network 140 may be, for example, an interne service provider (ISP) network connected to the Internet, while wireless base station 120 may be, for example, a base station complying with the WiFi (IEEE 802.11) or WiMAX (IEEE 802.16) standards. Together, computer network 140 and wireless base station 120 form a short-haul communications network.

Hybrid network 160 comprises cellular network 130 coupled to computer network 140 through control network 150. In one embodiment, control network 150 may comprise an applications processor, a gateway, and a location entity, such as a Home Location Register (HLR). U.S. Pat. No.

5,978,672, issued Nov. 2, 1999, and U.S. Pat. No. 6,181,935, issued Jan. 30, 2001, both entitled MOBILITY EXTENDED TELEPHONE APPLICATION PROGRAMMING INTERFACE AND METHOD OF USE and hereby incorporated by reference, disclose systems and methods for interconnecting different networks into a hybrid network. As disclosed in the U.S. Pat. No. 5,978,672, the applications processor and gateway of control network 150 may function as an interface by converting and reformatting messages between cellular network 130 and computer network 140.

Control network 150 may include a location entity that allows carriers to comply with CALEA and E911 rules by identifying the current routing information and location of hybrid device 105. In one embodiment, control network 150 may allow a law enforcement agency to access current routing information. In another embodiment, control network 150 may provide current routing information to the law enforcement agency. In yet another embodiment, control network 150 may provide location information associated with a 9-1-1 call to an emergency service using current routing information.

Control network 150 is coupled to routing preferences server 170 (hereinafter referred to as User-Notification Directed Routing or UNDR server). UNDR server 170 may employ, for example, a server-client architecture and/or device level programming through the use of TCP/IP and cellular signal processing methods to communicate with control network 150 and to route a wireless connection based on a user's routing preference. UNDR server 170 may store a user's preference setting in a database. In one embodiment, the user accesses UNDR server 170 through wireless base station 120 and computer network 140. Alternatively, the user may access UNDR server 170 through cellular base station 110 and cellular network 130. In another embodiment, the user accesses, enters, modifies, and/or saves user preferences into UNDR server 170 using a web-enabled device such as, for example, laptop computer 108. Laptop computer 108 may access UNDR 170 through a third wireless link 109 or through any other communications link. Alternatively, the user may access and/or enter its preferences stored at UNDR server 170 using hybrid device 105. UNDR server 170 may also configure IP routing and addressing based on default preferences so that the user has a default starting point when a preferred location is not available or is unreliable. It will be readily appreciated by one of ordinary skill in the art that deviations from this exemplary embodiment fall within the scope of the present invention.

Figure 2:
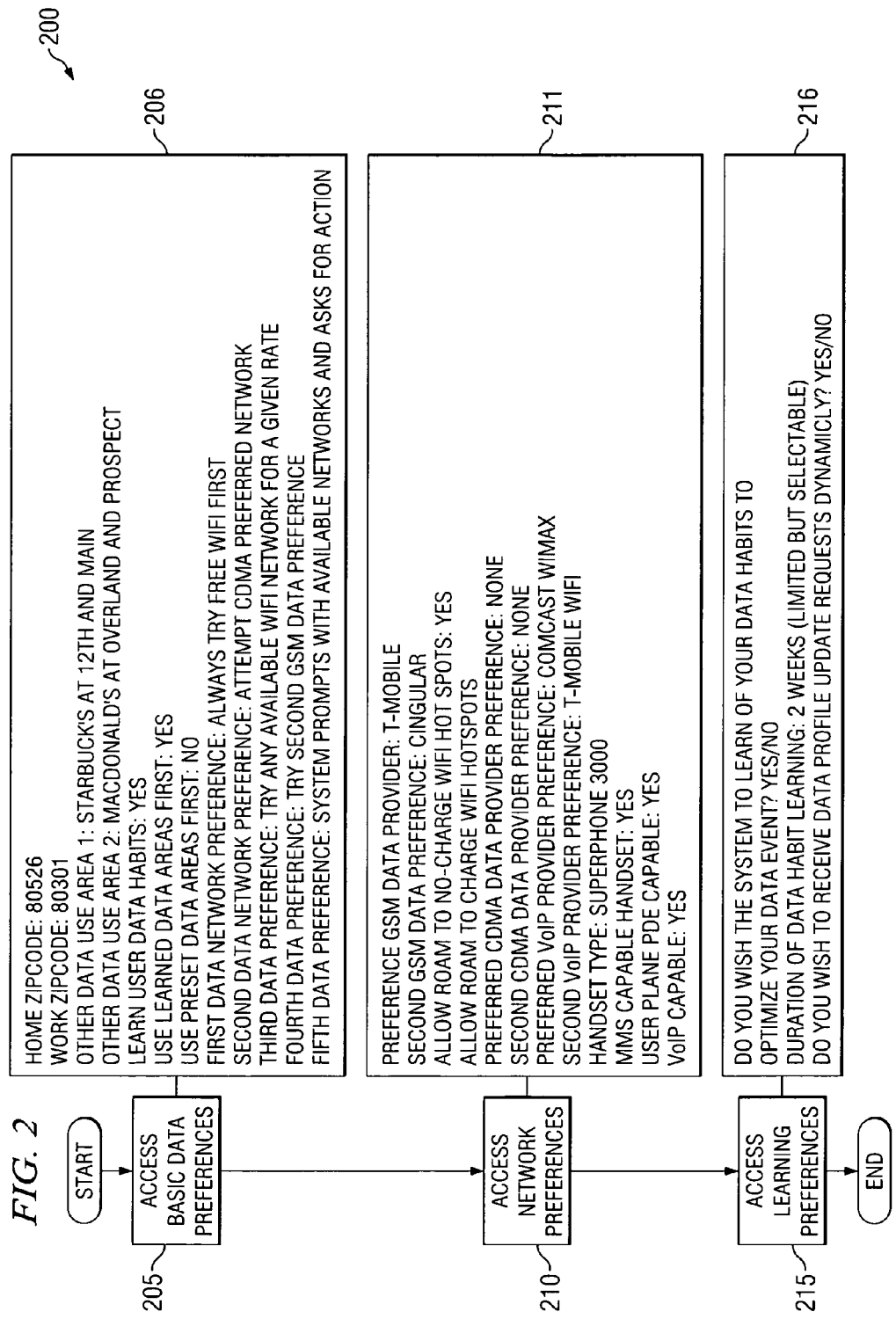
FIG. 2 is a diagram of a method for selecting routing preferences, according to an exemplary embodiment of the present invention.

Turning now to FIG. 2, a method for selecting routing preferences 200 stored in UNDR server 170 (of FIG. 1) embodying the present invention is depicted. In step 205, a user may access a set of basic data preferences. Exemplary basic data preferences 205 are shown in block 206, and may include one or more data access areas. A data access area may be selected by providing a physical address such as, for example, a street address and/or a zip code. In the non-limiting embodiment of block 206, a user's first data network preference indicates that the user would like to access data using free WiFi services first. The user's second data network preference indicates that a CDMA network connection should be attempted if the first preference is not fulfilled. The user's third preference is that any available WiFi network for a given rate should be used if the first and second preferences are not fulfilled. The user's fourth preference is that a GSM network should be accessed if the first, second, and third preferences cannot be fulfilled. Finally, the fifth preference is that the system provide a prompt indicating any available networks and requisition input from the user. Block 206 may also include a smart option, which is described in more detail below with respect to step 215.

In step 210, the user may access a set of network preferences. Exemplary network preferences 210 are shown in block 211, and may include a preferred cellular network provider, a computer network provider, roaming preferences, and hybrid device features. In the non-limiting embodiment of block 211, the user has indicated two preferred GSM data network providers. The user has also indicated that roaming to both no-charge and paid WiFi hotspots is allowed. Although, the user has not to selected any preferred CDMA data network providers, it has indicated two preferred VoIP providers. Hybrid device features may include handset type, Multimedia Message Service (MMS) capabilities, User-Plane Position Determining Entity (PDE) capabilities, and VoIP capabilities.

In step 215, the user may access a set of smart options or learning preferences. Exemplary smart options 215 are shown in block 216, and may include a learning activation option, a training period option, and a dynamic profile update option. In one exemplary embodiment, smart options 215 may allow UNDR server 170 to learn the user's habits (e.g., data, cellular, and/or VoIP connections with associated locations) so that it can optimize the user's preferences over a period of time. In another exemplary embodiment, UNDR 170 may identify access patterns. For instance, if a user frequently requests data services from a particular location, UNDR server 170 may dynamically adjust the user's routing preferences in order to minimize the costs of his or her data connections, depending upon which networks are available at that location. Additionally or alternatively, UNDER server 170 may adjust the user's routing preferences in order to maximize the reliability of services provided. In yet another exemplary embodiment, UNDR server 170 provides added services depending upon the user's location. Additionally, the hybrid network may provide enhanced 9-1-1 and CALEA services.

With respect to FIGS. 1 and 2, method 200 described above allows hybrid network 160 to route a network connection based upon the preferences stored in the UNDR server 170. Also, method 200 also allows the user to access either computer network 140 or cellular network 160 based on its routing preferences. Furthermore, method 200 allows the user to determine how it will access data or voice in future connections based upon its location and/or in reference to its routing preferences. It will be readily appreciated by one of ordinary skill in the art that deviations from this exemplary embodiment fall within the scope of the present invention. For example, each of the exemplary basic data preferences 206, network preferences 211, and learning preferences 216 may each include more or less options, and/or options other than those specifically described above. Moreover, steps 205, 210, and 215 may be grouped together in a single step containing all available options.

Turning now to FIG. 3, a call flow diagram embodying the present invention is depicted. Preferably, scenarios 305, 310, and/or 315 occur after the user has registered its preferences with the UNDR server 170 according to method 200 as described above. In a set-up procedure (not shown), hybrid device 105 may log into computer network 140 to download a basic profile information from UNDR server 170. In an alternative embodiment, hybrid device 150 accesses UNDR server 170 through the cellular network 160. Once registered, hybrid device 105 may poll UNDR server 170 to initiate a first data fix procedure. Once the first data fix procedure and a new updated location sensitive data is sent to the hybrid device 105, the user may then follow one of scenarios 305, 310, and/or 315.

A position request scenario 305 may be, for example, similar to a standard cellular registration flow known in the art. First, hybrid device 105 sends a registration request through any network available (130 or 140) based on a user profile that exists on device 105. Second, the network (130 or 140) passes the registration request through to the UNDR server 170, which queries the location entity of control network 150 for the location of hybrid device 105. Third, UNDR server 170 receives location information from the location entity of control network 150. Finally, UNDR server 170 may acknowledge receipt to hybrid device 105 and push any updates for local wireless to device 105 along with its optimal configuration and preset authentication and quality of service parameters. In an alternative embodiment, position request scenario 305 is configurable. Furthermore, UNDR server 170 may alter the registration dynamically based on user behavior.

In data-only session scenario 310, hybrid device 105 originates a data session directed to one of the available networks (130 or 140). In an alternative embodiment, hybrid device 105 originates a data session with access parameters presets. Subsequently, the network (130 or 140) accesses the user's computer or ISP network 140. Finally, hybrid device 105 receives access acknowledgment from computer or ISP network 140, and a data only session between hybrid device 105 and ISP network 140 is established.

In VoIP data session scenario 315, hybrid device 105 originates a VoIP data session directed to a network (130 or 140). In an alternative embodiment, hybrid device 105 originates a VoIP data session with access parameters presets. Then, the network (130 or 140) accesses the user's computer or ISP network 140, and hybrid device 105 receives access acknowledgment from the computer or ISP network 140. Finally, hybrid device 105 begins a VoIP session through a VoIP switch within control network 150.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for routing a call across a hybrid network having a cellular network and a short-haul communications network, the method comprising:

storing a user's routing preference in a routing preferences server;

communicating the routing preference from the routing preferences server to a control network that couples the cellular network to the short-haul network; and using the control network to route a call across the hybrid network, wherein the call is originated by the user from a hybrid device that is associated with the user and wherein the hybrid device is configured to communicate with a cellular base station of the cellular network via a first wireless link and to communicate with a base station of the short-haul communication network via a second wireless link;

wherein:

the call is routed via the short-haul communications network if the routing preference of the user that originated the call indicates a short-haul communications network choice; and the call is routed via the cellular network if the routing preference of the user that originated the call indicates a cellular network choice.

2. The method of claim 1 where the call may be one of: a data call, and a voice call.

3. The method of claim 1 where the routing preference comprises a data access area.

4. The method of claim 1 further comprising allowing a law enforcement agency to access current routing information.

5. The method of claim 1 further comprising providing location information associated with a 9-1-1 call to an emergency service using current routing information.

6. The method of claim 1 where the routing preference comprises a Voice over Internet Protocol (VoIP) provider preference.

7. The method of claim 1 further comprising routing a data call based on a data access habit of the user.

8. The method of claim 1 further comprising routing a voice call based on a cellular network access habit of the user.

9. The method of claim 1 further comprising routing a VoIP call based on a VoIP access habit of the user.

10. A system comprising:

a routing preferences server for storing a routing preference selected by a user;

a control network coupled to the routing preferences server, where the control network is one of an applications processor, a gateway, or a location entity, and is operable to connect a cellular network to a short-haul communications network;

wherein the routing preferences server is operable to communicate the routing preference selected by the user to the control network;

wherein the control network is operable to route a call across the hybrid network, wherein the call is originated by the user from a hybrid device that is associated with the user and wherein the hybrid device is configured to communicate with a cellular base station of the cellular network via a first wireless link and to communicate with a base station of the short-haul communication network via a second wireless link; and wherein:

the control network routes the call via the short-haul communications network if the routing preference of the user that originated the call indicates a short-haul communications network choice; and the control network routes the call via the cellular network if the routing preference of the user that originated the call indicates a cellular network choice.

11. The system of claim 10 where control network is operable to route the call via the short-haul communications network if the routing preference indicates a short-haul communications network choice.

12. The system of claim 10 where control network is operable to route the call via the cellular network if the routing preference indicates a cellular network choice.

13. The system of claim 10 where the cellular network is selected from the group consisting of: a Global System for Mobile (GSM) network, a Time Division Multiple Access (TDMA) network, a Code Division Multiple Access (CDMA) network, and a Personal Communications Services (PCS) network.

14. The system of claim 10 where the short-haul communications network comprises an Internet Service Provider (ISP) network.

15. The system of claim 10 where the short-haul communications network includes a wireless base station.

16. The system of claim 10 further comprising means for allowing a law enforcement agency to access current routing information.

17. The system of claim 10 further comprising means for providing current routing information to a law enforcement agency.

18. The system of claim 10 further comprising means for providing location information associated with a 911 call to an emergency service using current routing information.

19. The method of claim 1, further comprising providing to the user a service that is dependent upon the user's location.

20. The system of claim 10, wherein the routing preferences server is operable to provide to the user a service that is dependent upon the user's location.

21. The method of claim 1 wherein the connection is routed based on one or more of an access habit of the user, an access pattern of the user, or a reliability of a service provided to the user.

22. The method of claim 1 wherein the short-haul communication network complies with at least one of WiFi and WiMax standards.

23. A method comprising:
- at a routing preferences server, storing a user's routing preference;
- at the routing preferences server, receiving a registration request from a hybrid device;
- from the routing preferences server, querying a location entity of a control network for the location of the hybrid device;
- at the routing preferences server, receiving the location of the hybrid device;
- from the routing preferences server, acknowledging receipt of the registration request to the hybrid device and pushing updates for local wireless to the hybrid device based on the location of the hybrid device.

* * * * *